March 10, 1964 — M. CAVERO — 3,124,179

CHAIN SAW

Filed July 2, 1962

Manuel Cavero
INVENTOR.

BY *(signatures)*
Attorneys

3,124,179
CHAIN SAW
Manuel Cavero, 151B Russ St., San Francisco, Calif.
Filed July 2, 1962, Ser. No. 206,672
2 Claims. (Cl. 143—135)

This invention relates to new and useful improvements in power chain saws and has for its primary object to provide, in a manner as hereinafter set forth, a machine tool of the character comprising a novel construction, combination and arrangement of teeth whereby a wide, clean, uniform cut may be rapidly made in various kinds of wood with a minimum of power, thus ensuring ample clearance for rivet heads, etc.

Another important object of the present invention is to provide an improved, cool-running chain saw of the aforementioned character wherein the teeth may be expeditiously and repeatedly sharpened with a conventional triangular file.

A further object of the invention is to provide a power chain saw of the character set forth which is highly efficient at susbtantially all speeds.

Another object is to provide a power saw of the character described comprising a unique mounting for the endless chain for safe, easy running.

Other objects of the invention are to provide an improved power chain saw which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
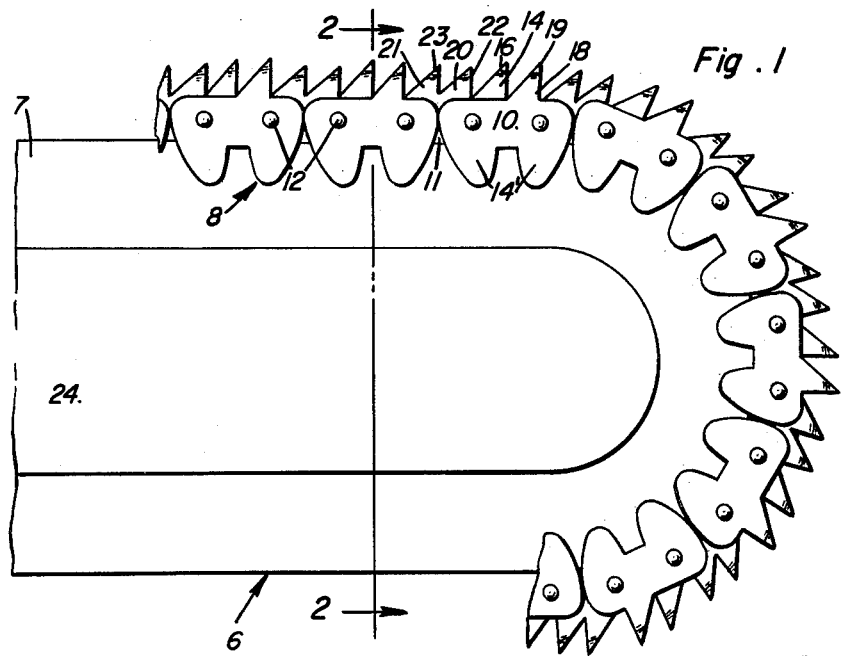
FIGURE 1 is an elevational view of the forward end portion of a power chain saw constructed in accordance with the present invention, looking at the outer side thereof.

Referring now to the drawing in detail, it will be seen that refernce numeral 6 designates generally the forward end portion of an elongated frame. The frame 6 includes on its marginal portions an endless track or rail 7. Operable on the track or rail 7 is an endless chain of suitable metal which is designated generally by reference numeral 8. Of course, the frame 6, the rail 7 and the endless chain 8 may also be of any desired dimensions. The outer side of the chain saw assembly is shown in FIGURE 1 of the drawing.

The chain 8 includes inner and outer cutter links 9 and 10, respectively, and intermediate raker links 11. The links 9 and 10 and the links 11 are staggered relatively to each other with their end portions lapped and pivotally connected by suitable pins or rivets 12, registering openings 13 being provided in said links for said pins or rivets.

The intermediate raker links 11 travel on the periphery or edge of the rail 7. The chain 8 is retained in position on the rail 7 through the medium of lugs or legs 14' which are integral with the cutter links 9 and 10 and which receive said rail therebetween.

Formed integrally with the inner links 9 adjacent the rear ends thereof are cutting teeth 14 comprising beveled forward cutting edges 15 which terminate in outwardly set cutting tips 16. The teeth 14 further comprise inclined trailing edges 17.

Formed integrally with the outer links 10 adjacent the forward ends thereof are cutter teeth 18. The teeth 18 are substantially similar to the teeth 14 with the exception that the tips 19 thereof are oppositely set.

Figure 4:
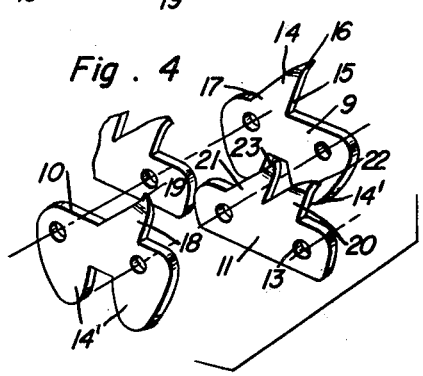
FIGURE 4 is a perspective view of the teeth, showing the same separated.

The links 9, 10 and 11 are of substantially equal length. Formed integrally with the links 11 are pairs of raker or cleaning teeth 20 and 21 comprising oppositely set raking tips 22 and 23, respectively. The raker teeth 20 and 21 are spaced equidistantly from the ends of the links 11. As shown to advantage in FIGURE 4 of the drawing, the raker teeth 20 and 21 are shorter than the cutter teeth 14 and 18.

Figure 2:
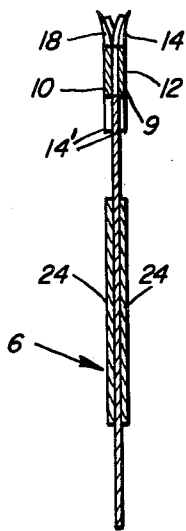
FIGURE 2 is a view in transverse section, taken substantially on the line 2—2 of FIGURE 1.
Figure 3:
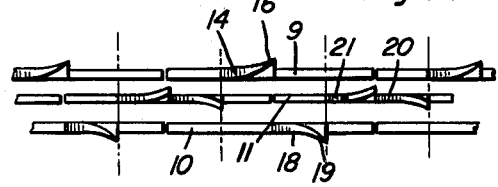
FIGURE 3 is a plan view of the teeth of the chain, showing said teeth separated.
Figure 5:
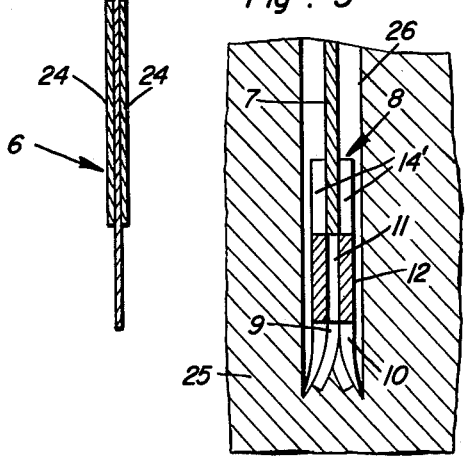
FIGURE 5 is a sectional view through a portion of a log, showing the saw in operation therein.

It is thought that the operation of the saw will be readily apparent from a consideration of the foregoing. Of course, the endless chain 8 is conventionally powered. The length of the guide legs or lugs 14' of the links 9 and 10 is sufficient to ensure retention of the chain 8 on the rail 7. As best seen in FIGURE 2 of the drawing, the frame 6 includes side plates 24 which strengthen and rigidify the rail 7. The endless chain 8 travels clockwise in FIGURE 1 of the drawing and said chain cuts forwardly. In FIGURE 5 of the drawing, refernce numeral 25 designates a portion of a log in which a cut 26 is being made by the saw. The teeth 14, 18, 20 and 21 may be given any desired set with a conventional tool. Also, the teeth may be rapidly and accurately sharpened with an ordinary triangular file. Of course, the teeth 14 and 18 cut the kerf 26 and the teeth 20 and 23 clean said kerf.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a chain saw chain comprising, pairs of spaced side-by-side cutter links having raker links pivotally connected at their opposite ends between the adjacent ends of adjacent pairs of cutter links in staggered relation thereto, a cutter tooth on one link of each pair of cutter links adjacent one end thereof and set to the corresponding side of the chain, a cutter tooth on the other link of each pair of cutter links adjacent the other end thereof, and also set to the corresponding side of the chain, a pair of oppositely set raker teeth on each of the raker links, said cutter and raker teeth being disposed at approximately equally spaced points along said chain and facing in the same direction, a support rail defining at least a portion of a closed path about which said chain is adapted to pass, said rail including a pair of generally parallel side guide surfaces terminating at one edge portion in a bearing surface extending between said disposed generally normal to said guide surfaces, said raker links each including a generally planar undersurface disposed in sliding contacting relation with said bearing surface and said cutter links each including a pair of depending longitudinally spaced projections, said projections of each pair of cutter links slidingly embracing said guiding surfaces, said raker teeth being slightly shorter than said cutter teeth.

2. A chain saw chain comprising pairs of spaced side-by-side cutter links having raker links pivotally connected at their opposite ends between the adjacent ends of adjacent pairs of cutter links in staggered relation thereto, a cutter tooth on one link of each pair of cutter links, adjacent one end thereof and set to the corresponding side of the chain, a cutter tooth on the other link of each pair of cutter links adjacent the other end thereof and also set to the corresponding side of the chain, a pair of oppositely set raker teeth on each of the raker links, said cutter and raker teeth being disposed at approximately equally spaced points along said chain and facing in the same direction, said raker teeth being slightly shorter than said cutter teeth.

References Cited in the file of this patent

UNITED STATES PATENTS

| | | |
|---|---|---|
| 1,559,233 | Frunk | Oct. 27, 1925 |
| 2,327,233 | Wolf | Aug. 17, 1943 |
| 2,984,269 | Gates | May 16, 1961 |

FOREIGN PATENTS

| | | |
|---|---|---|
| 268,249 | Switzerland | Aug. 1, 1950 |